(12) United States Patent
Fischer

(10) Patent No.: US 7,032,491 B2
(45) Date of Patent: Apr. 25, 2006

(54) DEVICE FOR SPIRALLY CUTTING A WORKPIECE

(75) Inventor: Johan W. Fischer, Bethal (ZA)

(73) Assignee: Midnight Masquerade Properties 49 (Pty) Ltd., Blackheath (ZA)

( * ) Notice: Subject to any disclaimer, the term of this patent is extended or adjusted under 35 U.S.C. 154(b) by 51 days.

(21) Appl. No.: 10/476,676

(22) PCT Filed: May 2, 2002

(86) PCT No.: PCT/IB02/01471
§ 371 (c)(1),
(2), (4) Date: May 19, 2004

(87) PCT Pub. No.: WO02/090061
PCT Pub. Date: Nov. 14, 2002

(65) Prior Publication Data
US 2004/0187655 A1   Sep. 30, 2004

(30) Foreign Application Priority Data
May 4, 2001   (ZA) .................................. 2001/3596

(51) Int. Cl.
*B26D 3/08* (2006.01)

(52) U.S. Cl. ........................... 83/879; 83/733; 83/932; 99/538

(58) Field of Classification Search .......... 83/861–887, 83/733, 932; 82/101; 99/538, 537
See application file for complete search history.

(56) References Cited

U.S. PATENT DOCUMENTS

| 2,489,581 | A |   | 11/1949 | Mason |        |
|-----------|---|---|---------|-------|--------|
| 3,211,202 | A | * | 10/1965 | Mason | 99/592 |
| 4,581,990 | A |   | 4/1986  | Matsumoto |   |
| 5,251,543 | A |   | 10/1993 | Brothers |    |
| 5,671,659 | A |   | 9/1997  | Swindle |     |
| 6,269,740 | B1| * | 8/2001  | Kojs  | 99/537 |

FOREIGN PATENT DOCUMENTS

| DE |   49517 | 11/1889 |
|----|---------|---------|
| FR | 2692188 | 12/1993 |

\* cited by examiner

Primary Examiner—Kenneth E. Peterson
Assistant Examiner—Isaac N. Hamilton
(74) Attorney, Agent, or Firm—Sheridan Ross P.C.

(57) ABSTRACT

The invention relates to a device (10) for cutting a workpiece (38), mounted onto an elongate rod (36), into a spiral formation. The device includes a frame (12) defining a workspace (14), and a locating mechanism (34) for locating the rod longitudinally along the workspace. A chuck (40), rotatable about an axis of rotation, is located in the workspace for holding and rotating the work piece about an axis co-axial with the axis of the rod. A carriage (44) which is transportable longitudinally along the workspace releasably mounts a cutting tool (46) extending transversely to the workspace. The device includes also a transport mechanism (48) for transporting the carriage longitudinally along the workspace and a displacement mechanism (34) for displacing the locating mechanism, and hence in use the rod, longitudinally along the workspace. The device further includes a drive mechanism (52) for driving the transport mechanism, the displacement mechanism and rotatingly driving the chuck.

17 Claims, 5 Drawing Sheets

DEVICE FOR SPIRALLY CUTTING A WORKPIECE

THIS INVENTION relates to cutting of a workpiece into a spiral formation. It relates more particularly to a device for cutting a workpiece, mounted onto an elongate rod, into a spiral formation and to a system for cutting a workpiece, mounted onto an elongate rod, into a spiral formation. It relates also to a method of cutting a workpiece, mounted onto an elongate rod, into a spiral formation and to a spacing tool for use in the system.

The invention is expected to be particularly advantageously applicable to cutting of foodstuff into a spiral formation and that application will particularly be borne in mind for purposes of this specification.

According to a first aspect of the invention there is provided a method of cutting a workpiece into a spiral formation, which method includes
mounting the workpiece onto an elongate rod;
rotating the workpiece about an axis thereof co-axial with a longitudinal axis of the rod; and
feeding a cutting tool disposed transversely to the rod longitudinally along the rod cuttingly to engage the rotating workpiece, thereby to cut the workpiece into a spiral formation.

The method may include the step of spacing loops of the spiral formation along the rod by displacing the rod, relative to an uncut portion of the workpiece, longitudinally in a direction opposite to the direction of feed of the cutting tool.

According to another aspect of the invention, there is provided a device for cutting a workpiece, mounted onto an elongate rod, into a spiral formation, which device includes
a frame defining an elongate workspace;
locating means for locating the rod longitudinally along the workspace;
a chuck rotatable about an axis of rotation and located in the workspace for holding and rotating the workpiece about an axis co-axial with the longitudinal axis of the rod;
a carriage releasably mounting a cutting tool extending transversely to the workspace, the carriage being transportable longitudinally along the workspace;
transport means for transporting the carriage longitudinally along the workspace;
displacement means for displacing the locating means, and hence in use the rod, longitudinally along the workspace; and
drive means for driving the transport means, the displacement means and rotatingly driving the chuck.

The chuck may be longitudinally fixed in the workspace and have a central aperture for passing the rod, the locating means including two longitudinally spaced, co-axial seats for locatingly seating ends of the rod, the seats being inter-secured with an operatively fixed distance between them and with the chuck, having its central aperture co-axial with the seats, being between the seats.

The transport means may include a primary leadscrew extending longitudinally alongside the workspace and rotatably mounted to the frame to be rotatable about an axis parallel to the chuck rotational axis.

The carriage may include a saddle screw threadingly engaging the primary leadscrew and a tool mount fast with the saddle for mounting the cutting tool. Hence, relative rotation between the saddle and the primary leadscrew results in longitudinal displacement of the carriage.

The displacement means may include a secondary leadscrew parallel to the primary leadscrew and rotatably mounted to the frame.

The seats may be inter-secured by an elongate framework having first and second ends and a nut formation at or proximate the first end thereof screw threadingly engaging the secondary leadscrew to facilitate longitudinal displacement of the framework and, hence, the seats.

The device may include at least one guide rail mounted to the frame and parallel to the secondary leadscrew, the or each guide rail being engaged by a guide formation provided at or proximate the second end of the framework for guiding the framework along the guide rail in the workspace.

The frame may include a head end and a tail end in between which the workspace is defined.

The chuck may be provided at the head end of the frame. The guide rail may be provided in the workspace and the secondary leadscrew may extend beyond the head end of the frame.

The cutting tool may be an elongate tool mounted at its mid-section to the tool mount so that an operatively head end thereof leads its operatively rear end upon transportation of the carriage toward the chuck, the device including an elongate guide mounted to the head end of the frame and extending parallel to the primary leadscrew along at least a part of the workspace for guiding the rear end of the cutting tool, thereby to prevent rotation of the saddle relative to the frame along the head end part of the workspace.

The chuck, the primary leadscrew and the secondary leadscrew may be drivingly interconnected and the drive means may include a crank or a rotary electric motor operatively connected to one of the chuck, the primary leadscrew or the secondary leadscrew.

The driving interconnection of the chuck, the primary leadscrew and the secondary leadscrew may be by means of a gear train, the gears of which are fast with the chuck, the primary leadscrew and the secondary leadscrew, respectively.

The seat secured to the second end of the framework may be pivotally secured to the framework about an axis transverse to the at least one guide rail, in use, to increase the fixed distance between the seats thereby to facilitate location of the rod.

According to still another aspect of the invention, there is provided a system for cutting a workpiece, mounted onto an elongate rod, into a spiral formation, which system includes
a device as hereinbefore described; and
a spacing tool for spacing the workpiece on the rod at a predetermined distance from one end of the rod.

The spacing tool may be in the form of an elongate sheath receivable over one end of the rod, with a passage of the sheath being of a depth equal to the predetermined distance, and an open end of the sheath providing an abutting surface for abutting the workpiece.

The invention extends to a spacing tool for use in the system.

The invention is now described by way of example with reference to the accompanying diagrammatic drawings.

Figure 1:
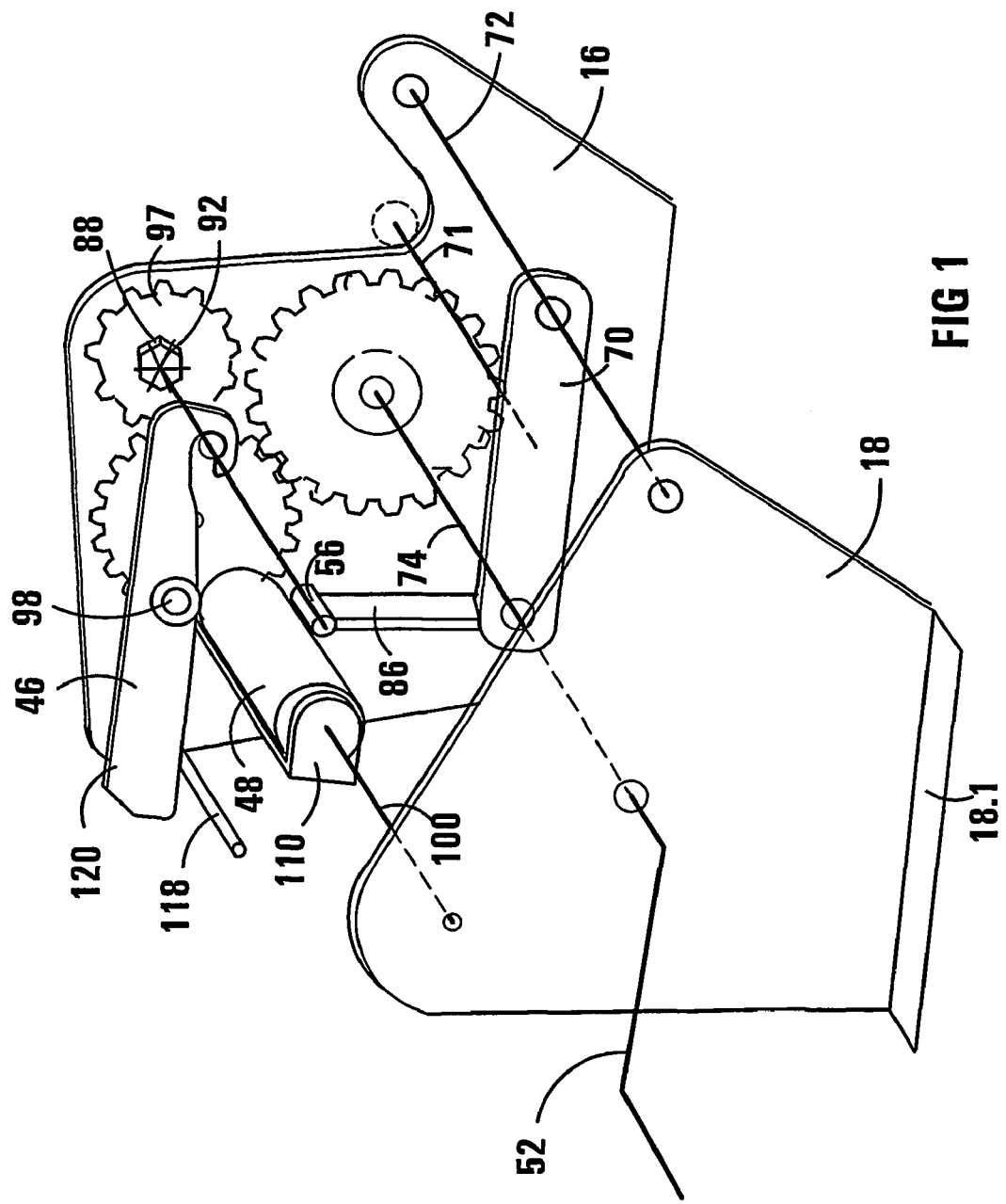
FIG. 1 shows, in three-dimensional view, a line diagram of a device for cutting a workpiece, mounted onto an elongate rod, into a spiral formation in accordance with the invention.

With reference to the drawings, a device in accordance with the invention is generally indicated by reference numeral 10.

The device 10 includes a frame, generally indicated by reference numeral 12, defining an elongate workspace generally indicated by reference numeral 14. The frame 12 is constituted by two upright laterally spaced, parallel head and tail end plates 16, 18 intersecured by an elongate, rectangular cross-sectioned crossbar 20. The end plates 16, 18 provide laterally outwardly protruding feet 16.1, 18.1 along their entire widths. Ends of the crossbar 20 provide T-shaped sections 22, 24 abutting inner faces of the end plates 16, 18 and providing apertures (not shown) aligned with complemental apertures (also not shown) in the end plates 16, 18 for passing bolts forming part of bolt and nut arrangements 26, 28, 30, 32 by means of which the crossbar 20 is bolted to the end plates 16, 18.

The device 10 includes locating means, generally indicated by reference numeral 34, for locating an elongate rod, in this embodiment a wooden skewer 36, mounting a workpiece in kebab-fashion, in this embodiment a potato 38, longitudinally along the workspace 14. The locating means 34 is described in more detail hereinafter.

The device 10 includes also a rotatable chuck 40 located in a longitudinally fixed position at a head end of the workspace 14. In use, the chuck 40 (described in more detail hereinafter) abuts one end of the potato 38 and rotates it about an axis co-axial with the longitudinal axis of the skewer 36. The chuck 40 provides a central aperture 42 for passing the skewer 36.

The device 10 includes also a carriage, generally indicated by reference numeral 44, mounting an elongate cutting tool 46 extending transversely to the workspace 14. The carriage 44 (described in more detail hereinafter) is displaceable longitudinally along the workspace 14 by means of transport means in the form of a primary leadscrew 48 rotatably mounted in between the head end plate 16 and the tail end plate 18.

The device 10 further includes displacement means for displacing the locating means 34, and hence in use, the skewer 36 longitudinally along the workspace 14. The displacement means is in the form of a secondary leadscrew 50 rotatably mounted to and extending beyond the head end plate 16.

The device 10 yet further includes drive means in the form of a crank 52 for rotatingly driving the primary leadscrew 48, the secondary leadscrew 50 and the chuck 40 which are drivingly interconnected by means of a gear train generally indicated by reference numeral 53.

The locating means 34 is in the form of two socket like, operatively inwardly facing co-axial seats 54, 56 spaced longitudinally apart at an operatively fixed distance. The operatively fixed distance is equal to the length of the skewer 36. A bearing 57 in the form of a spherical ball (the function of which is described hereinafter) is located rotatably or fixed within the seat 54. The seats 54, 56 are intersecured by means of a framework, generally indicated by reference numeral 58.

The framework 58 has a first end 60 spaced longitudinally outwardly from the head end plate 16 and provides a nut formation 62 screw threadingly engaging the secondary leadscrew 50. A second end 64 of the framework 58 provides two guide formations in the form of two laterally spaced sleeves 66, 68 between the head end plate 16 and the tail end plate 18. The sleeves, 66, 68 are intersecured by means of a rectangular cross-sectioned securing bar 70 which is secured to the second end 64 of the framework 58. The first end 60 and the second end 64 of the framework 58 are intersecured by means of an L-shaped, circular cylindrical bar 71. The sleeves 66, 68 slidably engage guide rails 72, 74. The guide rails 72, 74 are laterally spaced, extend parallel to the primary leadscrew 48, and are mounted to the head end plate 16 and the tail end plate 18. Ends of the guide rail 72 are screw threaded and the rail 72 is mounted to the head end plate 16 and the tail end plate 18 by means of pairs of nuts 76, 78 threaded onto the screw threaded ends of the rail 72 so as to sandwich the respective end plates 16, 18 between them.

The guide rail 74 is co-axial with and drivingly connected to the secondary leadscrew 50. At a head end of the workspace 14, the secondary leadscrew 50 mounts a gear 83 forming part of the gear train 53. The end plates 16, 18 mount bearings 80, 82 through which ends of the guide rail 74 rotatably pass.

The seats 54, 56, in turn, are connected to the nut formation 62 and the sleeve 66 respectively by means of upwardly extending, rectangularly cross-sectioned arms 84, 86. The arm 86 is pivotally mounted to the sleeve 66 so as to be pivotable in the direction of arrow 88 about an axis transverse to the guide rail 74. In use, the seat 56 can be pivoted to facilitate location or removal of the skewer 36.

The chuck 40 has a circular cylindrical body 88 and is rotatably mounted to the head end plate 16 by means of a bearing 90 mounted to the head end plate 16. At an end thereof facing into the workspace 14, the chuck 40 provides a plurality of retaining blades or vanes 92 onto which one end of the potato 38 is urged, by the cutting tool 46, to be held in use. The blades or vanes 92 extend radially outwardly from the central aperture 42. In between its end providing the blades or vanes 92 and the head end plate 16, the chuck 40 mounts a gear 94 forming part of the gear train 53.

The carriage 44 is constituted by a saddle 96 screw threadingly engaging the primary leadscrew 48, and a tool mount 98, for mounting the cutting tool 46, fast with an operatively upper part of the saddle 96. The primary leadscrew 48 extends partially longitudinally along the head end of the workspace 14. Toward a tail end of the workspace 14, the primary leadscrew is co-axially secured to a circular cylindrical saddle guide 100. The primary leadscrew 48 and the saddle guide 100 are respectively rotatably mounted to the head end plate 16 and the tail end plate 18 by means of bearings 102, 104. At the head end of the workspace 14, the primary leadscrew 48 mounts a gear 106 forming part of the gear train 53.

The saddle guide 100 is slidingly engaged by a sleeve 108 fast with the saddle 96 by means of an elongate, rectangular cross-sectioned connecting member 110. The length of the connecting member 110 is such that it permits a predetermined distance of displacement only of the saddle 96 along the primary leadscrew 48, thereby to prevent the cutting tool 46 from contacting the blades or vanes 92 in use.

The elongate cutting tool 46 is mounted at a mid-section thereof to the tool mount 98. The cutting tool 46 has a head end 112 (the purpose of which is described hereinafter) providing a recess 114 complemental to the skewer 36, in use, to receive the skewer 36. In between its mid-section and its head end 112, the cutting tool 46 has an elongate cutting edge 116. The recess 114 provides a shoulder 114.1 which is operatively higher than a lowest part 114.2 of the recess 114 to ensure that the skewer 36 is retained within the recess 114 upon rotation of the workpiece 38 and, hence, the skewer 36.

The device 10 further includes a circular cylindrical cutting tool guide 118 spaced operatively outwardly from and parallel to the primary leadscrew 48 and extending along the head end of the workspace 14. In use, the cutting tool guide 118 guides a rear end 120 of the cutting tool to prevent rotational movement of the saddle 96, and hence pivotal movement of the cutting tool 46, relative to the head end plate 16. The cutting tool guide 118 has a screw threaded end which is screw threadingly engaged by two nuts 122, 124 in between which the head end plate 16 is sandwiched. The cutting tool guide 118 is thus mounted to the head end plate 16 and protrudes longitudinally inwardly therefrom.

The crank 52 is connected to an end of the guide rail 74 extending beyond the tail end plate 18. The secondary leadscrew gear 83 is thus a driven gear and its teeth operatively engage teeth of the primary leadscrew gear 106 which, in turn, engage teeth of the chuck gear 94. It is to be appreciated that the drive means need not necessarily be a crank, but could be any other appropriate drive means such as, for example, an electric, possibly battery operated, rotary motor. The device 10 may then also include a rechargeable battery. When the drive means is in the form of an electric rotary motor, the device 10 may include two limit switches arranged to control rotation of the motor so that displacement of the carriage 44 and, hence, the cutting tool 46 along the workspace 14 is limited between two longitudinally opposed points in between which the potato 38 is located and cut in use. Here, in addition, the drive means may also include a removable crank to facilitate manual operation of the device 10 upon failure of the electric rotary motor. The drive means could alternatively be operatively connected to any one of the gears 94, 106.

Figure 2:
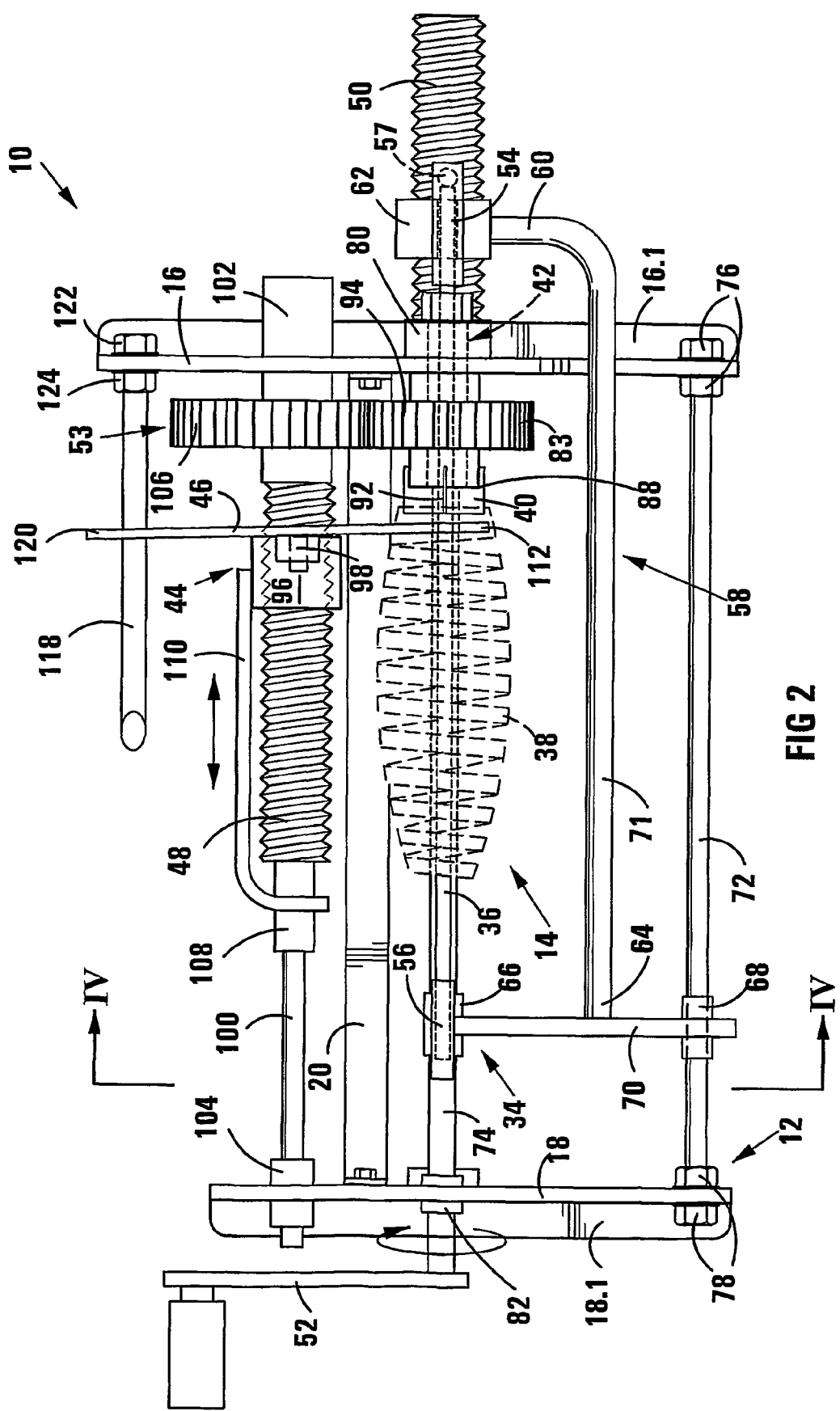
FIG. 2 shows, in top plan view, the device of FIG. 1.
Figure 3:
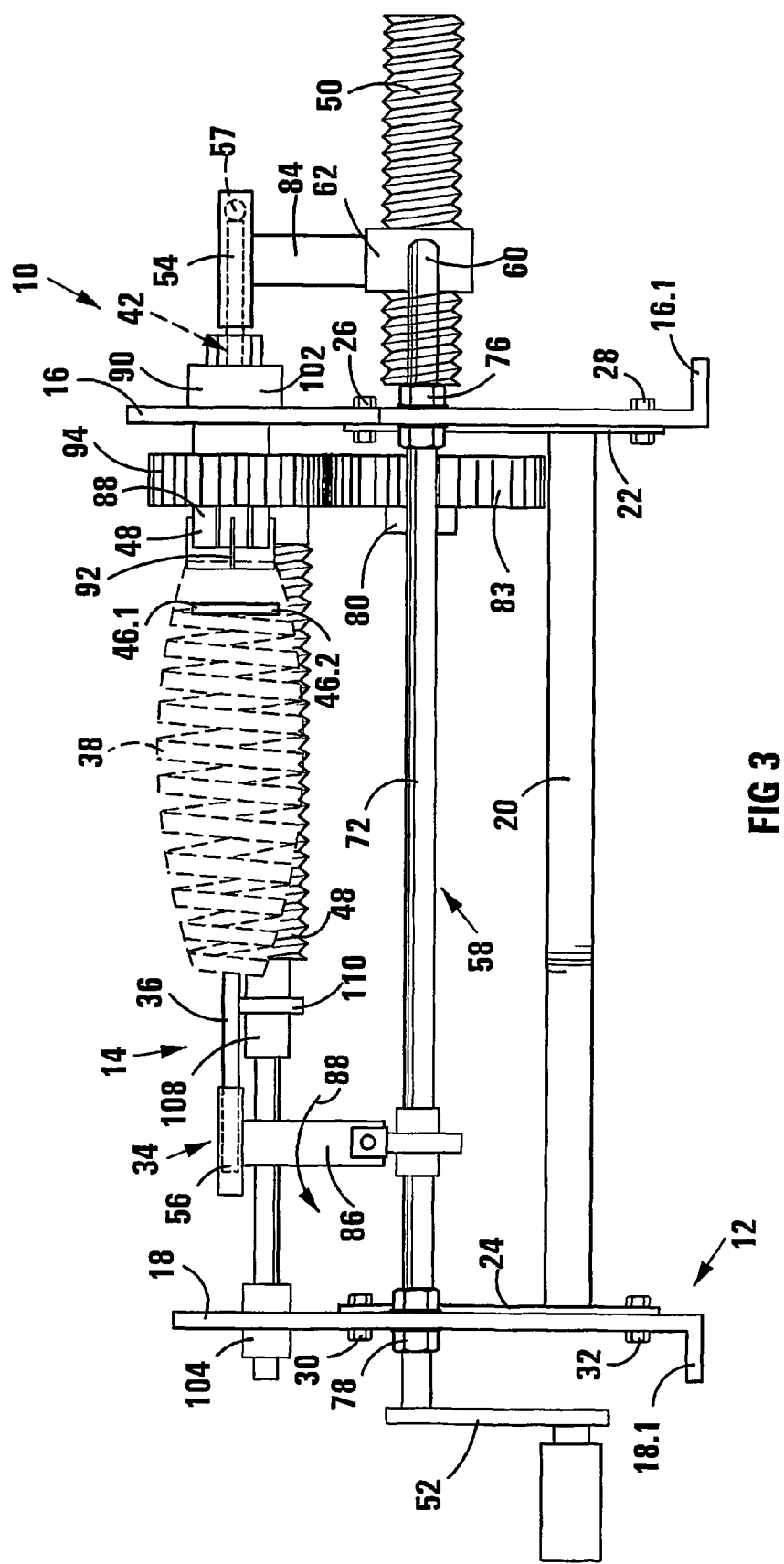
FIG. 3 shows, in front view, the device of FIG. 1.
Figure 4:
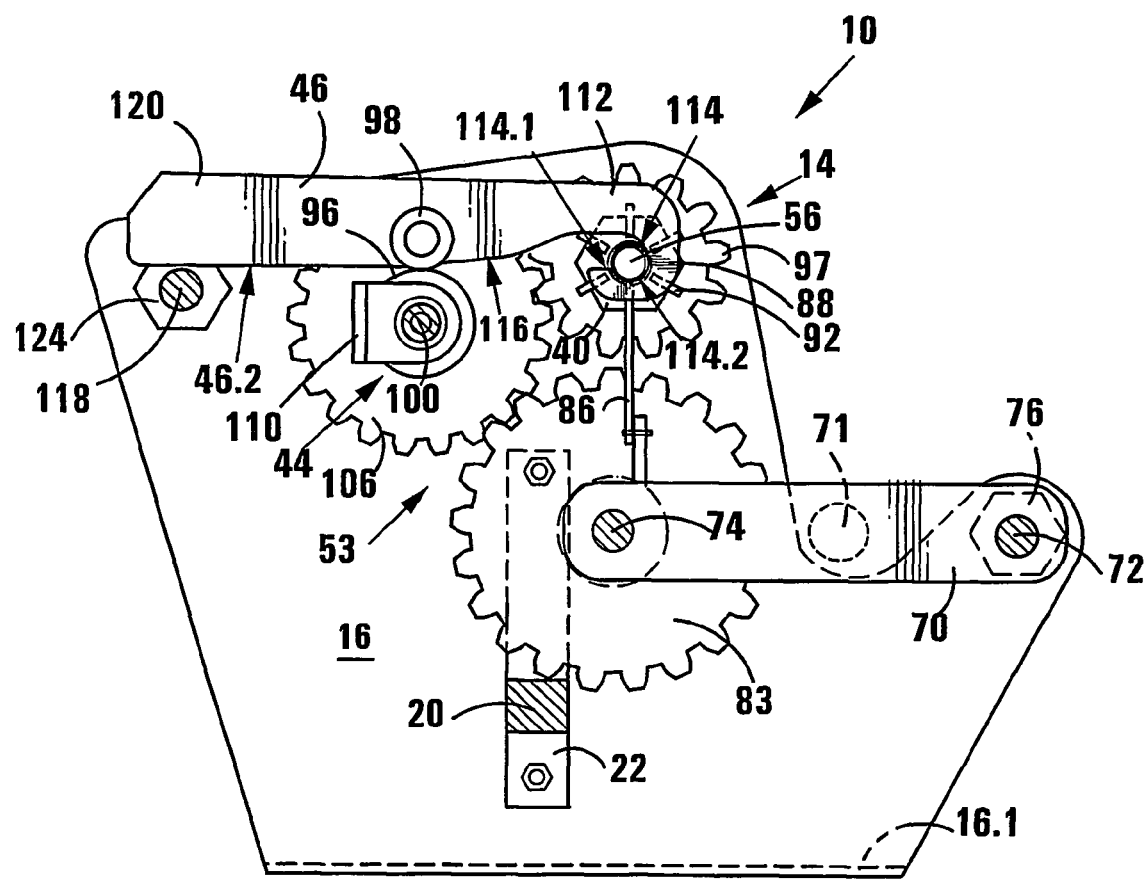
FIG. 4 shows a sectional side view of the device taken at IV—IV in FIG. 2.
Figure 5:
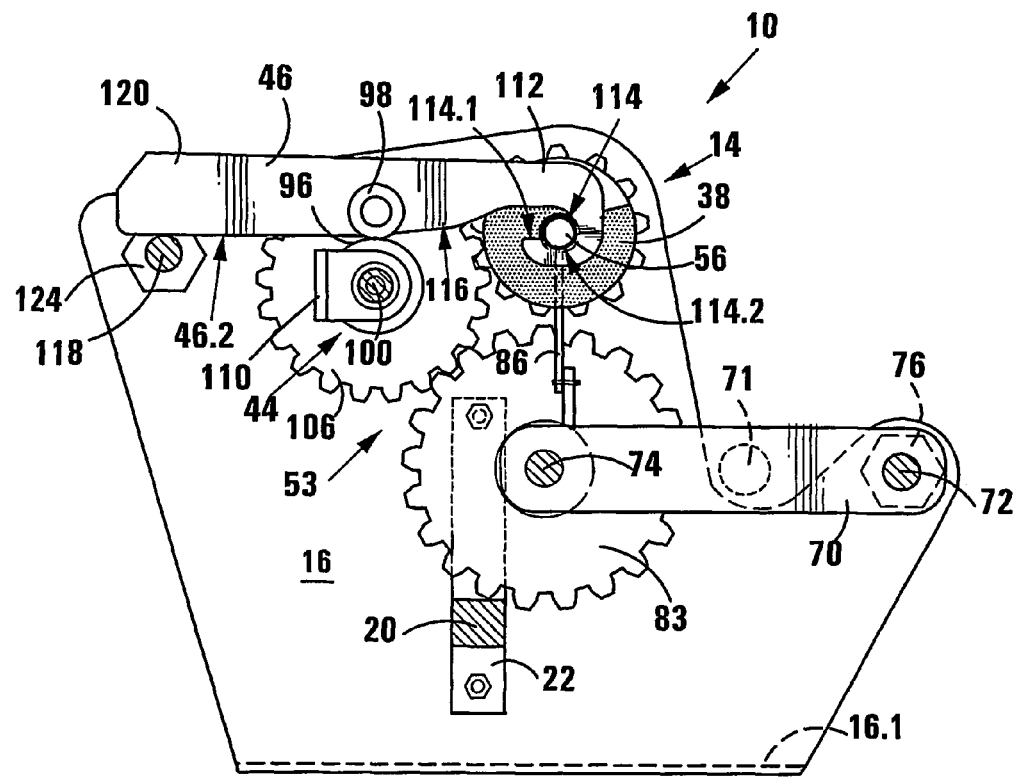
FIG. 5 shows a view corresponding to that of FIG. 4 with a workpiece operatively located in the device.

As can been seen in FIG. 2, the cutting tool 46 extends slightly obliquely into the workspace 14 at an angle of offset of about 1,5° relative to the head end plate 16 so that its head end 112 leads its rear end 120 upon displacement thereof toward the head end plate 16. Instead, or in addition, a top edge 46.1 of the cutting tool 46 may lead its bottom edge 46.2 upon displacement toward the head end plate 16. Here also, if applicable, the angle of offset relative to the head end plate 16 may be about 1,5°. It is believed that the oblique orientation of the cutting tool 46 enhances the cutting operation, as hereinafter described.

Figure 6:
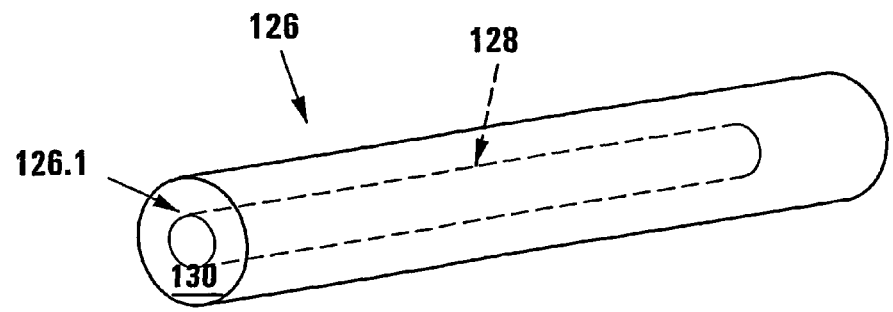
FIG. 6 shows, in three-dimensional view, a spacing tool forming part of a system in accordance with the invention.

Referring now to FIG. 6 of the drawings, a spacing tool forming part of a system in accordance with the invention is generally indicated by reference numeral 126. In use, the spacing tool 126 is used to space a workpiece 38, on the skewer 36 at a predetermined distance from one end of the skewer 36.

The spacing tool 126 is in the form of an elongate, circular cylindrical sheath providing a longitudinal, blind bore 128. The bore 128 is of a depth equal to the predetermined distance at which the workpiece 38 should be spaced from an end of the skewer 36. An open end 126.1 of the tool, i.e. that end out of which the bore 128 opens, provides an annular surface 130 which, in use, engages an end of the workpiece 38.

In use, the workpiece 38, which as hereinbefore described is a potato, is mounted kebab-fashion onto the skewer 36. To this end the skewer 36 will typically have a sharpened end. The spacing tool 126 is received over that end of the skewer which is to be closest to the workpiece 38, and is used to move the workpiece along the skewer. In use, the spacing tool 126 is either pushed over the skewer 36 or can be used in a hammering fashion to move the workpiece 38 along the skewer 36. Upon moving of the workpiece 38 along the skewer 36, the annular surface 130 engages an end of the workpiece 38. Naturally, the spacing tool can only move the workpiece 38 to a distance from the end of the skewer 36 equal to the depth of the bore 128.

Once the workpiece 38 is mounted at the desired position on the skewer 36, the skewer 36 with workpiece 38 is located in the seats 54, 56. Location involves passing an end of the skewer 36 through the chuck central aperture 42 and into the seat 54. In this position the blades 92 bite into the surface of the potato 38. The seat 56 is pivoted in the direction of arrow 88 and the cutting tool 46 is positioned so that its recess 114 receives the skewer 36. Once the skewer and cutting tool 46 are in position, the seat 56 is pivoted back to its operative position, as shown in the drawings, to receive the other end of the skewer 36. The bearing 57 reduces friction between that end of the skewer 36 received in the seat 54 and an internal end wall of a bore of the seat 54 and, hence, inhibits possible longitudinal twisting of the skewer 36 in use.

The crank 52 is now rotated to displace or feed the cutting tool 46 longitudinally along the primary leadscrew 48 toward the head end of the workspace 14 and into contact with the workpiece 38. Upon contact of the leading head end 112 of the cutting tool 46 with the workpiece 38, the head end 112 applies a longitudinally directed force on the workpiece 38, thereby to urge the workpiece 38 onto the vanes or blades 92 of the chuck 40. On account of the driving interconnection of the primary leadscrew 48, the chuck 40 and the secondary leadscrew 50, the chuck 40 and the secondary leadscrew 50 are driven simultaneously with the primary leadscrew 48.

Rotation of the chuck 40 results in rotation of the workpiece 38, thereby ensuring that the longitudinally moving cutting tool 46 cuts the workpiece 38 into a spiral formation. Rotation of the secondary leadscrew 50 results in displacement of the locating means 34 in a direction opposite to that of the displacement or feed of the cutting tool 46. This displacement of the locating means 34 results in displacement of the skewer 36 relative to an uncut portion of the workpiece 38, thereby to space loops of the spiral formation workpiece 38 along the skewer 36. A force exerted on the uncut portion of the workpiece by the head end 112 of the cutting tool 46 is greater than a frictional force of the skewer 36 being fed through the uncut portion of the workpiece 38, and hence, the uncut portion of the workpiece 38 is immovable along the workspace 14 and urged onto the vanes or blades 92 of the chuck 40.

When the cutting tool 46 reaches its fully displaced position as determined by the connecting member 110, the seat 56 is once again pivoted in a direction of arrow 88 and the cut potato 38 and the skewer 36 are removed from the device 10.

Loops of the cut potato 38 are firmly secured, in spaced relationship, on the skewer 36, and if desired, the potato 38 can then be cooked, e.g. by submerging it in hot oil, and seasoned after which it can be eaten from the skewer 36.

Once the potato 38 and skewer 36 have been removed, the crank 52 is displaced in an opposite direction to displace the cutting tool 46 and the locating means 34 to their starting positions. The next potato 38 to be cut can then be mounted on the device in the manner described above.

The invention claimed is:
1. A device for cutting a workpiece, mounted onto an elongate rod, into a spiral formation, which device includes
a frame defining an elongate workspace;
locating means for locating the rod longitudinally along the workspace;

a chuck rotatable about an axis of rotation and located in the workspace for holding and rotating the workpiece about an axis co-axial with the longitudinal axis of the rod;

a carriage releasably mounting a cutting tool extending transversely to the workspace, the carriage being transportable longitudinally along the workspace;

transport means for transporting the carriage longitudinally along the workspace in a first direction;

displacement means for displacing the locating means in a second direction opposite the first direction, and hence in use the rod, longitudinally along the workspace; and drive means for driving the transport means, the displacement means and rotatingly driving the chuck.

2. A device as claimed in claim 1, in which the chuck is longitudinally fixed in the workspace and has a central aperture for passing the rod, the locating means including two longitudinally spaced, co-axial seats for locatingly seating ends of the rod, the seats being inter-secured with an operatively fixed distance between them and with the chuck, having its central aperture co-axial with the seats, being between the seats.

3. A device as claimed in claim 1, in which the transport means includes a primary leadscrew extending longitudinally alongside the workspace and rotatably mounted to the frame to be rotatable about an axis parallel to the chuck rotational axis.

4. A device as claimed in claim 3, in which the carriage includes a saddle screw threadingly engaging the primary leadscrew and a tool mount fast with the saddle for mounting the cutting tool.

5. A device as claimed in claim 3, in which the displacement means includes a secondary leadscrew parallel to the primary leadscrew and rotatably mounted to the frame.

6. A device as claimed in claim 5, in which the seats are inter-secured by an elongate framework having first and second ends and a nut formation at or proximate the first end thereof screw threadingly engaging the secondary leadscrew to facilitate displacement of the framework and, hence, the seats.

7. A device as claimed in claim 6, which includes at least one guide rail mounted to the frame and parallel to the secondary leadscrew, the or each guide rail being engaged by a guide formation provided at or proximate the second end of the framework for guiding the framework along the guide rail in the workspace.

8. A device as claimed in claim 7, in which the seat secured to the second end of the framework is pivotally secured to the framework about an axis transverse to the at least one guide rail, in use, to increase the fixed distance between the seats thereby to facilitate location of the rod.

9. A device as claimed in claim 5, in which the frame includes a head end and a tail end in between which the workspace is defined.

10. A device as claimed in claim 9, in which the chuck is provided at the head end of the frame.

11. A device as claimed in claim 9, in which the guide rail is provided in the workspace and the secondary leadscrew extends beyond the head end of the frame.

12. A device as claimed in claim 9, in which the cutting tool is an elongate tool mounted at its mid-section to the tool mount so that an operatively head end thereof leads its operatively rear end upon transportation of the carriage toward the chuck, and in which the device includes an elongate guide mounted to the head end of the frame and extending parallel to the primary leadscrew along at least a part of the workspace for guiding the rear end of the cutting tool, thereby to prevent rotation of the saddle relative to the frame along the head end part of the workspace.

13. A device as claimed claim 5, in which the chuck, the primary leadscrew and the secondary leadscrew are drivingly interconnected and the drive means includes a crank or an electric rotary motor operatively connected to one of the chuck, the primary leadscrew or the secondary leadscrew.

14. A device as claimed in claim 13, in which the driving interconnection of the chuck, the primary leadscrew and the secondary leadscrew is by means of a gear train, the gears of which are fast with the chuck, the primary leadscrew and the secondary leadscrew.

15. A system for cutting a workpiece, mounted onto an elongate rod, into a spiral formation, which system includes
a device as claimed in claim 1; and
a spacing tool for spacing the workpiece on the rod at a predetermined distance from one end of the rod.

16. A system as claimed in claim 15, in which the spacing tool is in the form of an elongate sheath receivable over one end of the rod, the sheath having a blind bore of a depth equal to the predetermined distance, and an open end of the sheath providing an abutting surface for abutting the workpiece.

17. A spacing tool for use in a system as claimed in claim 15, which is in the form of an elongate sheath having a blind bore within which an end portion of an elongate rod is receivable, the bore having a depth which corresponds to the desired spacing between one end of a workpiece mounted on the rod and a seat of the device into which said end portion of the rod is receivable.

* * * * *